(12) United States Patent
Buser et al.

(10) Patent No.: US 11,779,190 B2
(45) Date of Patent: Oct. 10, 2023

(54) DISHWASHER SYSTEM WITH A REUSE TANK

(71) Applicant: WHIRLPOOL CORPORATION, Benton Harbor, MI (US)

(72) Inventors: Josef A. Buser, Schoenenberg-Kuebelberg (DE); Kristopher L. Delgado, Stevensville, MI (US); Scott D. Slabbekoorn, Greensboro, NC (US); Cristian A. Soto, Jersey City, NJ (US); Elliott V. Stowe, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/693,852

(22) Filed: Mar. 14, 2022

(65) Prior Publication Data
US 2022/0192459 A1    Jun. 23, 2022

Related U.S. Application Data

(60) Division of application No. 16/909,368, filed on Jun. 23, 2020, now abandoned, which is a division of
(Continued)

(51) Int. Cl.
*A47L 15/42*    (2006.01)
*A47L 15/00*    (2006.01)

(52) U.S. Cl.
CPC ....... *A47L 15/4291* (2013.01); *A47L 15/0057* (2013.01); *A47L 15/4236* (2013.01);
(Continued)

(58) Field of Classification Search
None
See application file for complete search history.

(56) References Cited

U.S. PATENT DOCUMENTS

| 2,721,574 A | 10/1955 | Parker |
| 4,395,882 A | 8/1983 | Kast et al. |
| (Continued) | | |

FOREIGN PATENT DOCUMENTS

| CN | 101254085 A | 9/2008 |
| CN | 101642361 A | 2/2010 |
| (Continued) | | |

OTHER PUBLICATIONS

Google Patents translation of JP2001161622A retrieved on Mar. 17, 2023 from https://patents.google.com/patent/JP2001161622A/en?oq=JP+2001161622 (Year: 2023).*

(Continued)

*Primary Examiner* — Eric W Golightly
(74) *Attorney, Agent, or Firm* — Price Heneveld LLP

(57) ABSTRACT

A dishwasher comprising a tub, a reuse tank, and a controller for implementing a wash cycle in the tub, the controller comprising a clock, the controller operably coupled to a recirculation pump and a drain pump, the controller configured (a) to cause the recirculation pump to supply liquid used during the wash cycle to the reuse tank, (b) to monitor via a clock a period of time that the liquid is within the reuse tank, and (c) when the period of time is greater than a predetermined period of time, (i) to cause a control valve in an outlet conduit to open and allow the liquid to flow from the reuse tank to a sump and (ii) to cause a drain pump to drain the liquid from the sump and out of the dishwasher.

11 Claims, 4 Drawing Sheets

Related U.S. Application Data application No. 15/865,844, filed on Jan. 9, 2018, now Pat. No. 10,736,483, which is a continuation of application No. 14/880,354, filed on Oct. 12, 2015, now Pat. No. 9,918,611, which is a division of application No. 12/967,106, filed on Dec. 14, 2010, now Pat. No. 9,192,282.

(52) U.S. Cl.
CPC ........ *A47L 2401/11* (2013.01); *A47L 2401/20* (2013.01); *A47L 2501/02* (2013.01); *A47L 2501/03* (2013.01); *A47L 2501/06* (2013.01); *Y02B 40/00* (2013.01)

(56) References Cited

U.S. PATENT DOCUMENTS

| | | |
|---|---|---|
| 4,776,891 A | 10/1988 | Murtha |
| 5,535,774 A | 7/1996 | Davies |
| 5,617,885 A | 4/1997 | Centis |
| 5,725,001 A | 3/1998 | Vogel |
| 5,729,025 A | 3/1998 | Erickson et al. |
| 5,829,459 A | 11/1998 | Milocco et al. |
| 5,899,097 A | 5/1999 | Adler |
| 6,591,846 B1 | 7/2003 | Ferguson et al. |
| 7,000,437 B2 | 2/2006 | Raney et al. |
| 7,597,108 B2 | 10/2009 | Giefer et al. |
| 7,691,209 B2 | 4/2010 | Reichold |
| 2004/0206394 A1 | 10/2004 | Swan |
| 2005/0056581 A1 | 3/2005 | Arguello |
| 2005/0183746 A1 | 8/2005 | McKee et al. |
| 2007/0022789 A1 | 2/2007 | Heiligenmann et al. |
| 2007/0277854 A1 | 12/2007 | Eiermann et al. |
| 2010/0000577 A1 | 1/2010 | Heiligenmann et al. |

FOREIGN PATENT DOCUMENTS

| | | |
|---|---|---|
| DE | 2910140 A1 | 9/1980 |
| DE | 3913355 A1 | 10/1990 |
| DE | 4004057 A1 | 8/1991 |
| DE | 9316754 U1 | 1/1994 |
| DE | 4243605 A1 | 6/1994 |
| DE | 19619690 A1 | 11/1996 |
| DE | 102007041308 A1 | 3/2009 |
| EP | 0467028 A1 | 1/1992 |
| EP | 0771898 A2 | 5/1997 |
| EP | 0911438 A1 | 4/1999 |
| EP | 0914800 A2 | 5/1999 |
| EP | 0911439 B1 | 11/2001 |
| EP | 1354549 A2 | 10/2003 |
| EP | 2031120 A1 | 3/2009 |
| EP | 2127587 A1 | 12/2009 |
| JP | 2142524 A | 5/1990 |
| JP | 429597 A | 4/1992 |
| JP | 7265252 A | 10/1995 |
| JP | 11104393 | 4/1999 |
| JP | 2001161622 A * | 6/2001 |
| JP | 2002263050 A | 9/2002 |
| JP | 2006167347 A | 6/2006 |
| JP | 2006239275 A | 9/2006 |
| JP | 2007007178 A | 1/2007 |
| JP | 2009090125 A | 4/2009 |
| JP | 2010057754 A | 3/2010 |
| KR | 20050046628 A | 5/2005 |
| KR | 20060012437 A | 2/2006 |
| KR | 20080075693 A | 8/2008 |
| KR | 20090038504 A | 4/2009 |
| KR | 1020100031175 A | 3/2010 |
| WO | 2005051157 A1 | 6/2005 |
| WO | 2006063895 A1 | 6/2006 |
| WO | 2006073373 A1 | 7/2006 |
| WO | 2009004019 A1 | 1/2009 |
| WO | 2009027320 A1 | 3/2009 |
| WO | 2010009890 A1 | 1/2010 |

OTHER PUBLICATIONS

Google Patents translation of DE 4243605 retrieved from https://patents.google.com/patent/DE4243605C2/en?oq=4243605 on Sep. 8, 2021 (Year: 2021).

German Search Report for DE102011054558.1, dated Jun. 29, 2015, 11 pages.

German Search Report for DE102011054560.3, dated Jun. 25, 2015, 11 pages.

DE3913355A1 Google Patent translation, retrieved from https://patents.google.com/patent/DE3913355A1/en?oq=DE+3913355 on Jun. 19, 2021 (Year: 2021).

* cited by examiner

DISHWASHER SYSTEM WITH A REUSE TANK

CROSS-REFERENCE TO RELATED APPLICATIONS

The present application is a divisional of and claims priority to U.S. patent application Ser. No. 16/909,368 entitled "DISHWASHER SYSTEM WITH A REUSE TANK" filed Jun. 23, 2020, which is a divisional of Ser. No. 15/865,844 entitled "DISHWASHER SYSTEM WITH A REUSE TANK" filed Jan. 9, 2018, now U.S. Pat. No. 10,736,483, which is a continuation of and claims priority to U.S. patent application Ser. No. 14/880,354 entitled "DISHWASHER SYSTEM WITH A REUSE TANK" filed Oct. 12, 2015, now U.S. Pat. No. 9,918,611, which is a divisional application of U.S. patent application Ser. No. 12/967,106 entitled "DISHWASHER SYSTEM WITH A REUSE TANK" filed Dec. 14, 2010, now U.S. Pat. No. 9,192,282, all of which are incorporated herein by reference in their entirety.

BACKGROUND OF THE INVENTION

Contemporary dishwashers for use in a typical household include a wash tub for storing utensils during the implementation of a wash cycle within the wash tub for cleaning of the stored utensils. A reuse tank may be provided to store liquid captured from the wash tub during a previous wash/rinse phase of the wash cycle. The stored liquid may be used in the same or subsequent wash cycles.

BRIEF DESCRIPTION OF THE INVENTION

A method of operating a dishwasher having a wash tub and a reuse tank for storing liquid for subsequent reuse, wherein the condition of the water in the reuse tank may be monitored and/or acted upon to limit the likelihood of undesired effects associated with the growth of micro-organisms in the liquid.

DESCRIPTION OF EMBODIMENTS OF THE INVENTION

The invention is generally directed toward the reuse of liquid in a dishwasher. The particular approach of the invention is to take liquid from any portion of a wash cycle and store it in a storage vessel for reuse. The stored liquid may be some or all of the liquid. It may be taken from one or more phases of a wash cycle, such as a wash phase, where the liquid is a mixture of detergent and water, or a rinse phase, where the liquid is primarily water, with or without a rinsing agent. The stored liquid may contain absorbed or non-absorbed soils from the utensils being washed and may not be used for an extended period of time. Under such conditions, it is anticipated that there is a possibility of the formation and buildup of micro-organisms, which may have varying undesirable side effects, most notably an odor that most consumers consider unpleasant. The invention addresses problems associated with the buildup of such micro-organisms.

Figure 1:
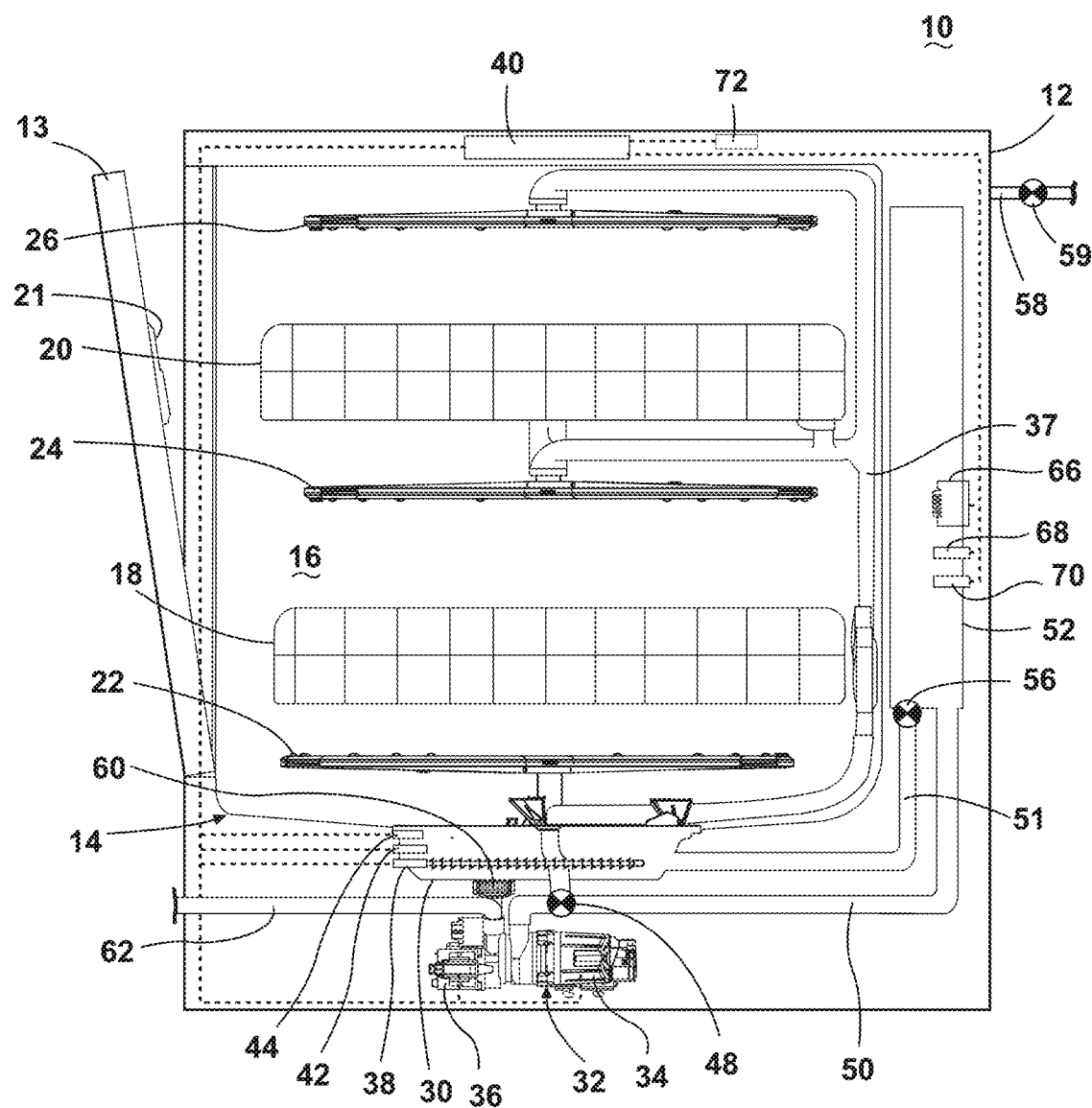
FIG. 1 is a schematic, side view of a dishwasher according to a first embodiment of the invention.

FIG. 1 is a schematic, side view of a treating appliance according to a first embodiment of the invention. The treating appliance in the form of a dishwasher 10 according to an embodiment of the invention may be any appliance which performs a cycle of operation to treat items placed therein, non-limiting examples of which include other types of dishwashing units, such as in-sink dishwashers, multi-tub dishwashers, or drawer-type dishwashers. The dishwasher 10, which shares many features of a conventional automated dishwasher, will not be described in detail herein except as necessary for a complete understanding of the invention.

The dishwasher may have a cabinet 12 defining an interior, which is accessible through a door 13. The cabinet 12 may comprise a chassis or frame to which panels may be mounted. For built-in dishwashers, the outer panels are typically not needed. At least one wash tub 14 is provided within the interior of the cabinet 12 and defines a treating chamber 16 to receive and treat utensils according to a cycle of operation, often referred to as a wash cycle, whether or not washing occurs. For purposes of this description, the term "utensil(s)" is intended to be generic to any item, single or plural, that may be treated in the dishwasher 10, including, without limitation; dishes, plates, pots, bowls, pans, glassware, and tableware.

A lower utensil rack 18 and an upper utensil rack 20 are provided in the treating chamber 16. The racks 18, 20 hold utensils (not shown) that may be treated in the treating chamber 16. The racks 18, 20 may be slid in and out of the treating chamber 16 through the opening closed by the door 13.

A detergent dispenser 21 may be located in the door 13 or virtually anywhere within the dishwasher 10. It will be understood that depending on the type of dishwasher and the type of detergent used, the detergent dispenser 21 may be incorporated into one dispensing mechanism. The detergent dispenser 21 may be of a single use dispenser type or a bulk dispenser type. In the case of bulk dispensing, the detergent and/or rinse aid can be selectively dispensed into the treating chamber 16 in a regulated quantity and at a predetermined time or multiple times during a cycle of operation.

A liquid supply system is provided for supplying liquid to the treating chamber 16 to implement a wash cycle and wash any utensils within the racks 18, 20. The liquid supply system includes liquid sprayers, in the form of spray arm assemblies 22, 24, 26, that are provided within the treating chamber 16 and are oriented relative to the racks 18, 20 such that liquid sprayed from the spray arm assemblies 22, 24, 26 may be directed into one or more of the racks 18, 20.

It should be noted that the stacked arrangement of the utensil racks and the spray arm assemblies is not limiting to the invention. It merely serves to illustrate the invention. For example, the invention may be implemented in a stacked arrangement having a silverware basket, the lower and upper utensil rack, and with upper, middle, and lower level spray arm assemblies having spray heads for the silverware basket alternatively arranged in between the lower and upper utensil rack.

The spray arm assemblies 22, 24, 26 may be fluidly coupled to the recirculation pump 34 through a spray arm support conduit 37 to receive and spray a flow of liquid having at least water, detergent, wash aid, or mixtures thereof, to the utensils in the lower and upper utensil rack 18, 20 inside the treating chamber 16.

The liquid supply system further comprises a sump 30 to collect by gravity, liquid sprayed within the treating chamber. The sump 30 is illustrated as being formed with or affixed to a lower portion of the wash tub 14 to collect liquid that may be supplied into or circulated in the wash tub 14 during, before or after a cycle of operation. However, the sump 30 may be remote from the wash tub 14 and fluidly coupled by suitable fluid conduits. In the illustrated embodiment, the sump 30 is disposed within the cabinet 12.

The liquid supply system further comprises a pump assembly 32 fluidly coupled to the sump 30, and as illustrated, may include the recirculation pump 34 and the drain pump 36. The recirculation pump 34 fluidly couples the sump 30 to the spray arm assemblies 22, 24, 26 through a spray arm supply conduit 37 to recirculate liquid that collects in the sump to the spray arm assemblies 22, 24, 26 for spraying on the racks 18, 20. The drain pump 36 fluidly couples the sump 30 to a drain conduit 62 for draining liquid collected in the sump 30 to a household drain, such as a sewer line, or the like.

The liquid supply system further comprises a reuse tank 52 for storing liquid captured during one or more phases/steps of a wash cycle for later use in the current wash cycle and/or a subsequent wash cycle. The reuse tank 52 may be fluidly coupled to the recirculation pump 34 by a reuse tank supply conduit 50 so that liquid from the sump 30 may be supplied to the reuse tank 52. A first control valve 48 controls the liquid from the recirculation pump to either the spray arm supply conduit 37 or the reuse tank supply conduit 50. The reuse tank 52 may also be fluidly coupled to the sump 30 by an outlet conduit 51 such that liquid in the reuse tank 52 may be supplied to the sump 30 for subsequent use. A second control valve 56 is provided in the outlet conduit 51 to control the supply of liquid from the reuse tank 52 to the sump 30. In the illustrated embodiment, the reuse tank 52 is disposed within the cabinet 12.

As illustrated, the physical relationship between the reuse tank 52 and the sump 30 uses gravity to supply the liquid from the reuse tank 52 to the sump 30. Thus, only the second control valve 56 and outlet conduit 51 are required. However, it is contemplated that the reuse tank 52 may be provided at other locations, some of which may be incapable of using gravity to supply the reuse liquid to the sump. Thus, it is contemplated that a pump could be provided to pump liquid from the reuse tank 52 to the sump 30, regardless of whether gravity can be used to supply the reuse liquid. It is also contemplated that either the recirculation pump 34 or drain pump 36 could be used for this purpose with the proper plumbing and valving.

While liquid may be provided to the reuse tank 52 through the wash tub 14 and the sump 30, the liquid may be directly provided to the reuse tank 52. For example, liquid having at least one of water, detergent, and treatment aid may be separately provided and mixed, such as by recirculation, in the reuse tank 52 to form the liquid. Alternatively, premixed mixture having at least one of water, detergent, and treatment aid may be directly provided and mixed, such as by recirculation, in the reuse tank 52 to clean the reuse tank 52.

It is noted that the capturing step may be reiterated multiple times for the multiple wash/rinse phases of a cycle of operation until multiple capture steps may provide enough amount of liquid which is sufficient to fill up the reuse tank 52 while only one time capturing step during any wash/rinse phase may be performed. It is also noted that whole amount of liquid for any wash/rinse phase during a cycle of operation may be captured to the reuse tank 52 through the recirculation pump 34 while only a portion of the liquid in the wash tub 14 may be captured and provided to the reuse tank 52.

Further as illustrated, the liquid in the reuse tank 52 may only be drained by supplying the liquid to the sump 30 and then actuating the drain pump 36. It is contemplated that a separate drain conduit (not shown) can be provided from the reuse tank 52 to the drain pump 36 to directly drain the liquid in the reuse tank without the liquid entering the sump.

It is further contemplated that the drain pump 36, instead of the recirculation pump 34, may be used to supply the liquid from the sump 30 to the reuse tank 52. In such a configuration, the reuse tank supply conduit 50 and control valve 48 are coupled to the drain conduit 62, instead of the spray arm supply conduit 37.

While the pump assembly 32 may include the recirculation pump 34 and the drain pump 36, in an alternative embodiment, the pump assembly 32 may include a single pump, which may be operated to supply liquid to either the drain conduit 62 or the spray arm support conduit 37, such as by rotating in opposite directions or by valves.

The liquid supply system further comprises a water supply conduit 58 fluidly coupling a water supply to the sump 30. A third control valve 59 controls the flow of water from the household supply to the sump 30.

The dishwasher 10 further comprises a control system having various components and sensors for controlling the flow and condition of the liquid to implement a wash cycle. The control system includes a heater 38 that may be located within the sump 30 to selectively heat liquid collected in the sump 30. The heater 38 may be an immersion heater in direct contact with liquid in the sump 30 to provide the liquid with predetermined heat energy. A temperature sensor such as a thermistor 42 may be provided in the sump 30 to provide an output that is indicative of the temperature of any fluid in the sump 30. If no liquid is in contact with the thermistor 42, then the signal will be indicative of the ambient air temperature in the cabinet 12. A pH sensor 44 may also be located near the bottom of the wall or in the sump 30 and provide an output indicative of the pH of the liquid in the sump 30.

It is also noted that additional sensors (not shown) such as a conductivity sensor or a turbidity sensor may be fluidly coupled to the wash tub 14 to provide output indicative of condition of the liquid.

The control system may further comprise a heater 66 provided in the reuse tank 52 to heat the liquid in the reuse tank 52. A thermistor 68 may be provided in the reuse tank and output a signal indicative of the temperature within the reuse tank 52. Similar to the heater 38, the heater 66 may also be in a direct fluid contact with liquid in the reuse tank 52 to provide heat energy to the liquid stored in the reuse tank 52. The thermistor 68 may be positioned such that the thermistor 68 may be in direct fluid contact with liquid in the reuse tank 52 during measurement. A pH sensor 70 may be coupled to the reuse tank 52 to output a signal indicative of the pH of liquid in the reuse tank 52. Additional sensors may be operably coupled to the reuse tank to monitor the characteristics of liquid in the reuse tank 52. Non-limiting examples of additional sensors include a turbidity sensor and a conductivity sensor.

Figure 2:
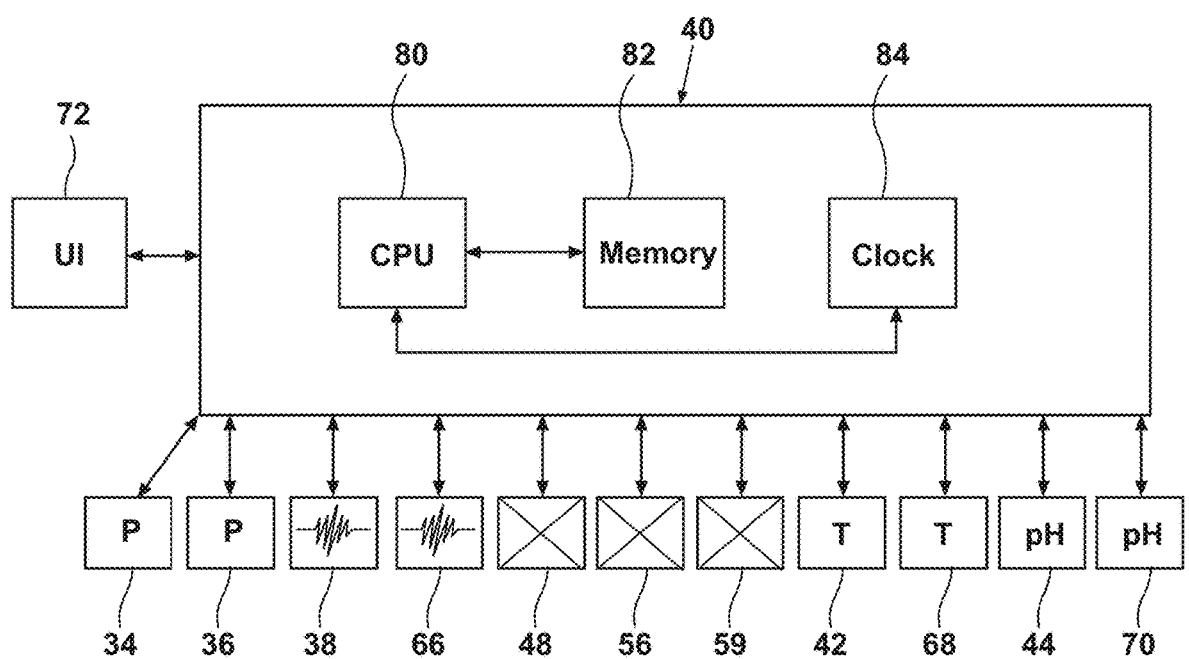
FIG. 2 is a schematic view of a control system of the dishwasher shown in FIG. 1.

The control system may further comprise a controller 40 for implementing one or more cycles of operation. As seen in FIG. 2, the controller 40 is operably coupled to the pumps 34, 36, heaters 38, 66, control valves 48, 56, 59, thermistors 42, 68, and pH sensors 44, 70 to either control these components and/or receive their input for use in controlling the components. The controller 40 is also operably coupled to a user interface 72 to receive input from a user for the implementation of the wash cycle and provide the user with information regarding the wash cycle. In this way, the controller 40 can implement a wash cycle selected by a user according to any options selected by the user and provide related information to the user.

The controller 40 may also comprise a central processing unit (CPU) 80 and an associated memory 82 where various wash cycle and associated data, such as look-up tables, may be stored. One or more software applications, such as an arrangement of executable commands/instructions may be stored in the memory and executed by the CPU 80 to implement the one or more wash cycles. The controller 40 may further include a clock 84. The clock 84 may be alternatively located in another component operably coupled to the controller 40.

The user interface 72 provided on the dishwasher 10 and coupled to the controller 40 may include operational controls such as dials, lights, knobs, levers, buttons, switches, and displays enabling the user to input commands to the controller 40 and receive information about the selected treatment cycle. The user interface 72 may be used to select a treatment cycle to treat a load of utensils. Non limiting examples of treatment cycles include normal, light/china, heavy/pots and pans, and rinse only. Alternatively, the treatment cycle may be automatically selected by the controller 40 based on the soil levels sensed by any sensors in the dishwasher 10 to optimize the treatment performance of the dishwasher 10 for a particular load of utensils.

FIGS. 3-7 are flow charts of various embodiments of the operation of the dishwasher 10. The sequence of steps depicted in FIGS. 3-7 is for illustrative purposes only, and is not meant to limit the methods in any way as it is understood that the steps may proceed in a different logical order, additional or intervening steps may be included, or described steps may be divided into multiple steps, without detracting from the invention. The methods may be incorporated into a cycle of operation for the dishwasher 10, such as prior to or as part of any phase of the wash cycle, such as a wash phase, rinse phase, and drying phase. The methods may also be a stand-alone cycle. It is noted that the methods may be used with or without the utensils placed within the treating chamber 16.

Figure 3:
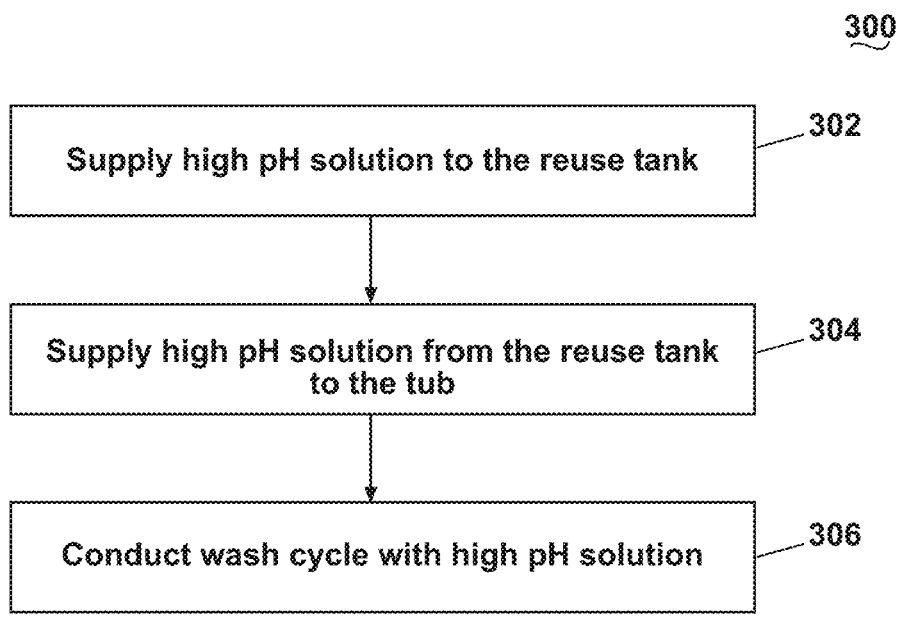
FIG. 3 is a flow chart of the operation of the dishwasher according to a second embodiment of the invention.

FIG. 3 is a flow chart of the operation of the dishwasher according to a second embodiment of the invention. The second embodiment provides for using a high pH solution to wash the reuse tank 52 to limit the growth of micro-organisms, with the benefit of using the high pH solution as part of the wash cycle.

The method 300 may begin at 302 by supplying high pH solution, such as a high pH liquid having a pH equal to or greater than 8.5 to the reuse tank 52. High pH solution can be directly provided to the reuse tank 52, or recirculated to form the high pH solution in the sump 30 and then provided to the reuse tank 52, which may be accomplished by providing water to the sump 30 in combination with a treating chemistry, such as detergent. The high pH solution may be flushed inside the reuse tank 52 or may be stored in the reuse tank 52 for a predetermined time period to clean and remove any micro-organisms and corresponding odor in the interior of the reuse tank 52.

At 304, the high pH solution may be supplied from the reuse tank 52 to the wash tub 14 after the high pH solution is in fluid contact with the interior of the reuse tank 52. At 306, the high pH solution supplied to the wash tub 14 may be used in a subsequent cycle of operation. The cycle of operation may be a typical wash cycle, which has one or more wash and rinse phases, with the pH solution being used for one or more of the wash or rinse phases. If the high pH solution is a detergent mixture, it is well suited for use in a wash phase of the standard wash cycle. Alternatively, the high pH solution may be used in a pre-wash phase where the high pH solution may be sprayed throughout the treating chamber 16 as part of a cycle of operation to clean the treating chamber 16. In one such use, the cycle of operation may be a specific cycle for cleaning the tub 14 and may be unrelated to the washing of utensils. Under these conditions, a portion or all of the high pH solution may be returned back to the reuse tank 52 for storage until needed for a subsequent wash/rinse phase. Alternatively, for example, in case the pH of the high pH solution decreases below a predetermined threshold after a pre-wash or wash phase, the high pH solution may be drained through the drain conduit 62 outside the dishwasher 10.

Figure 4:
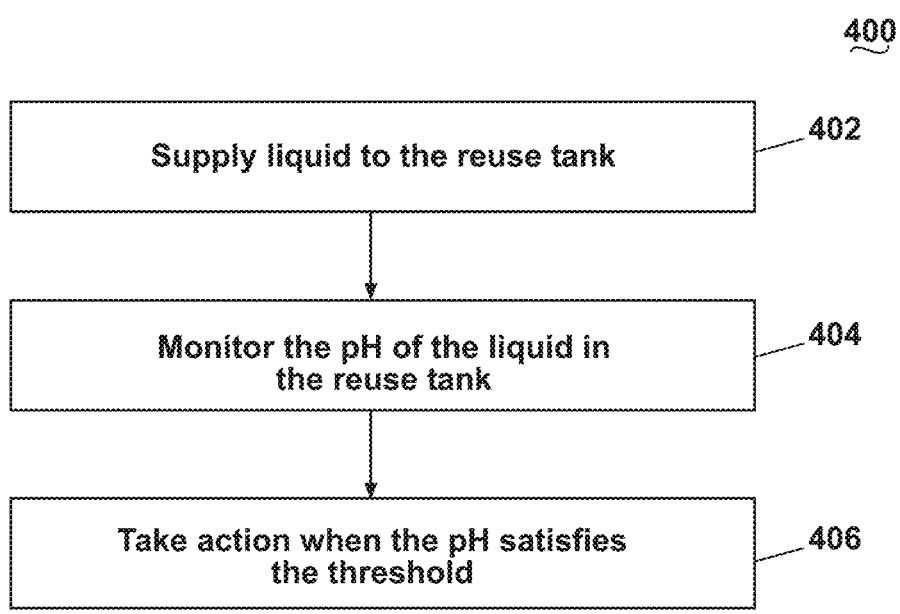
FIG. 4 is a flow chart of the operation of the dishwasher according to a third embodiment of the invention.

FIG. 4 is a flow chart of the operation of the dishwasher 10 according to a third embodiment of the invention where a high pH solution is stored in the tank to limit the growth of micro-organisms and the pH is monitored over time. The method 400 may begin at 402 by supplying liquid to the reuse tank 52. As with the second embodiment, the high pH solution may be directly supplied to the reuse tank 52, or circulated to form the high pH solution in the sump 30 and then supplied to the reuse tank 52. The high pH solution supplied to the reuse tank 52 for a predetermined period of time to remove any micro-organisms of the reuse tank 52.

At 404, the pH of the liquid may be monitored. The monitoring may take place in the reuse tank 52. Alternatively, if the high pH liquid is supplied to the tub 14 for use, the pH may be monitored when the high pH liquid is in the tub 14.

The pH of the high pH liquid may not be consistently maintained after use or over time, resulting in the pH possibly dropping low enough to no longer sufficiently limit the growth of micro-organisms. For example, liquid may include one or more enzymes, which may be provided with detergent/treatment aid or may be provided separately from other detergent/treatment aid. The reaction between one or more of enzymes that are present in the treating chamber 16 (e.g., one or more of proteases, lipases and amylases) and the food soils from the utensils may provide constituent products that are easily soluble in liquid through an enzymatic reaction. The increased concentration of the constituent products of the enzymatic reaction may decrease the pH of liquid over time or number of cycles of operation although the initial pH of the liquid may be high enough to limit the growth of micro-organisms.

In case the pH of liquid is below a pH threshold, such as 8.0, corrective actions may be taken at 406. For example, liquid may be drained to the wash tub 14, where a predetermined amount of detergent may be added to the wash tub 14 to increase the pH to satisfy the pH threshold. Specifically, when the pH sensor 70 provides the output which corresponds to the pH of the liquid that is below the pH threshold, the algorithm stored in the controller 40 may process the difference between the pH of liquid and the pH threshold to calculate the amount of detergent that may increase the pH of liquid to the pH threshold. The calculated amount of detergent may be provided to the wash tub 14 in the form of powder, liquid or mixture thereof. Alternatively, the pH of liquid may be monitored using the pH sensor 44 positioned inside the wash tub 14 until the addition of detergent may have reached a pH threshold, such as 8.5 or greater. The high pH liquid may then be supplied back to the reuse tank 52. In another example, liquid having pH less than pH threshold may be drained from the dishwasher 10 through the drain pump 36 and the drain conduit 62. A new charge of high pH solution may then be supplied to the reuse tank 52.

Figure 5:
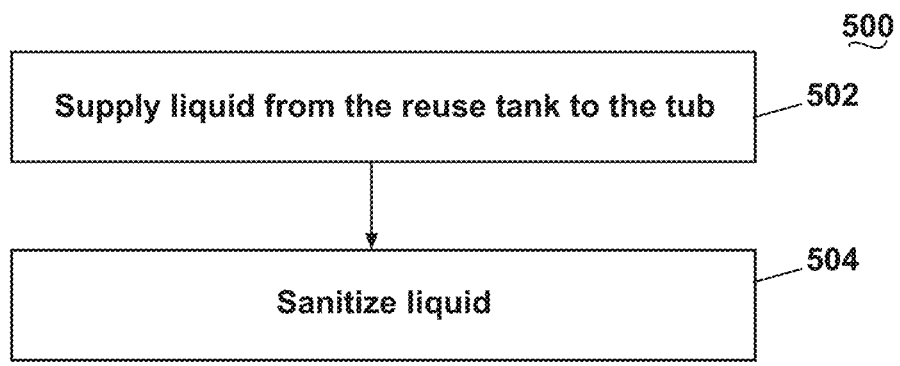
FIG. 5 is a flow chart of the operation of the dishwasher according to a fourth embodiment of the invention.

FIG. 5 is a flow chart of the operation of the dishwasher according to a fourth embodiment of the invention where the liquid in the reuse tank is sanitized to limit the growth of micro-organisms.

The method 500 may begin at 502 assuming that liquid is present in the reuse tank 52, with the liquid being supplied from the reuse tank 52 to the wash tub 14. The liquid may be sanitized in the wash tub 14 at 504. The sanitizing may be accomplished by using the sump heater 38 to heat the liquid in the sump 30 until sanitized. The currently accepted standard for sanitizing the liquid is to provide heat energy equal to or greater than 3600 HEU (Heat Equivalent Units) to the liquid to kill any micro-organisms, which will stop the associated odor.

One method of providing the 3600 HEU is to activate the heater 38 to heat the temperature of the liquid such as water to a range from about 62 to 77 degrees Centigrade for a time period of 900 to 10 seconds. Sanitization may be alternatively performed at a lower temperature for longer time, or at a higher temperature for shorter time as long as the heat energy satisfies the requirement of 3600 HEU. The thermistor 42 may be used to monitor the temperature of liquid and the clock 84 to track the time. The controller 40 may receive the inputs and make the final determination that a sanitizing combination of temperature and time has been reached. After sanitization, the liquid may be returned to the reuse tank 52 to clean any micro-organisms that may be present in the interior of the reuse tank 52. Alternatively, the sanitization may be performed in the reuse tank 52 using the heater 66 and thermistor 68 without draining the liquid to the reuse tank 52.

The sanitization may be performed periodically to kill the buildup of micro-organisms. For example, the sanitization may be repeatedly performed at a predetermined time interval regardless of the number of cycles of operation performed by dishwasher 10. In another example, the sanitization may be performed after a predetermined number of cycles of operation are performed. In yet another example, the sanitization may be performed anytime the liquid is supplied to the tub 14.

Figure 6:
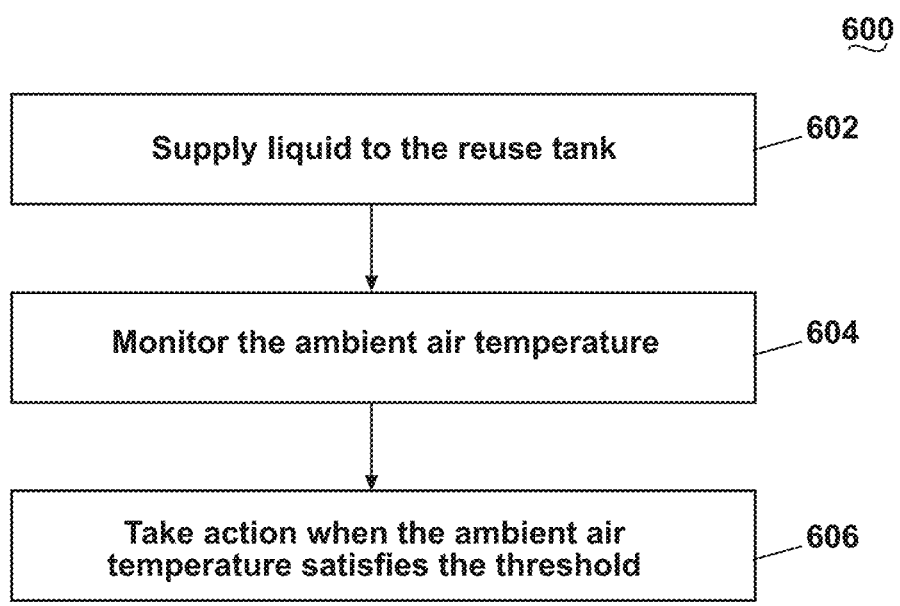
FIG. 6 is a flow chart of the operation of the dishwasher according to a fifth embodiment of the invention.

FIG. 6 is a flow chart of the operation of the dishwasher 10 according to a fifth embodiment of the invention where the ambient air temperature is monitored to determine environmental conditions to the dishwasher that are adverse to the presence of the liquid in the reuse tank. The method may begin at 602 by supplying liquid to the reuse tank 52.

The ambient air temperature may be monitored by the thermistor 42 coupled to the sump 30 at 604. The ambient air temperature may include the air temperature measured inside the dishwasher 10, including the tub 14, sump 30, drain conduit 62, or reuse tank 52, or around the dishwasher 10, using the thermistors 42, 68. When not executing a cycle of operation, there will come a time that the temperature in the sump 30, whether or not there is water in the sump 30, will be generally equal to the ambient temperature. Alternatively, the thermistor 68 coupled to the reuse tank 52 may be used to monitor the ambient air temperature when the temperature in the reuse tank 52 has equalized with the ambient temperature.

At 606, when the ambient air temperature is less than a predetermined threshold temperature, the liquid in the reuse tank 52 may be drained from the reuse tank 52. One contemplated temperature threshold is one that would indicate the liquid is likely to freeze, which might damage the tank 52. The temperature threshold may be set at a suitable safety margin above the freezing temperature, such as 3 degrees Centigrade. The draining of the liquid from the reuse tank 52 may be a multi-phase process. There may be an initial drain from the reuse tank 52 to the sump 30, where the liquid would have a greater volume in which to expand and potentially cause less damage. If the ambient temperature kept dropping, the liquid could be completely drained from the dishwasher 10 upon reaching a second threshold, lower than the first.

Alternatively, instead of draining the liquid from the reuse tank 52, the liquid may be heated. The heating may take place in the reuse tank 52 or in the sump 30. When heated in the sump 30, the liquid may or may not be immediately returned to the reuse tank 52. The liquid may be kept in the sump 30 until the ambient temperature rises.

It is also possible to heat the liquid in the reuse tank 52 prior to draining if it is determined the ambient temperature is such that some or all of the liquid may be frozen. In such a case, it may be desirable to not return the liquid to the reuse tank 52 until it is inspected. Thus, the liquid may be completely drained or kept in the tub 14.

Figure 7:
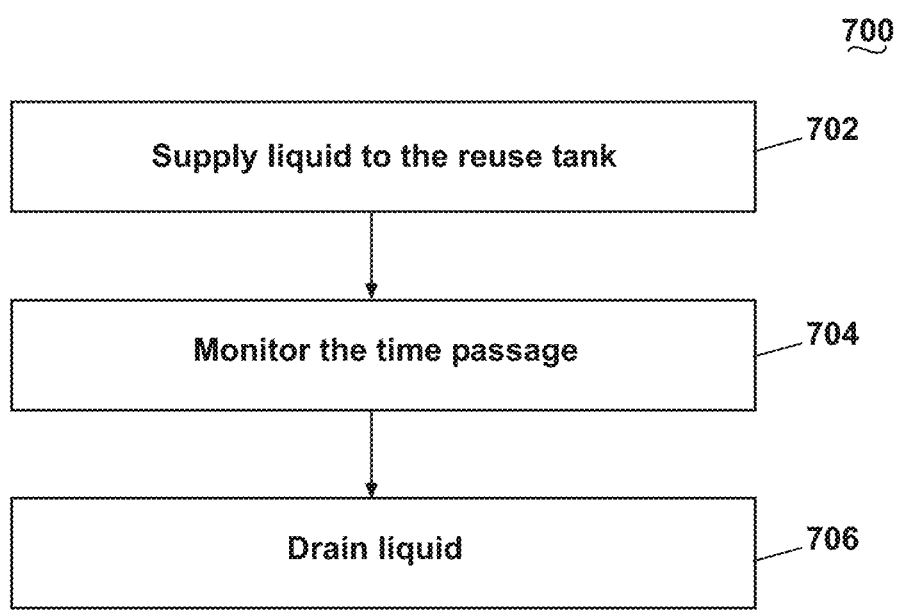
FIG. 7 is a flow chart of the operation of the dishwasher according to a sixth embodiment of the invention.

FIG. 7 is a flow chart of the operation of the dishwasher 10 according to a sixth embodiment of the invention. The method may begin at 702 by supplying liquid to the reuse tank 52, such as by using any of the previously described methods. At 704, the elapsed time for the liquid remains in the tank may be monitored using the clock 84. When the elapsed time is greater than a predetermined time period such as 72 hours, liquid may be drained from the reuse tank 52 at 706, such as by using any of the previously described methods.

The invention described herein provides methods for operating a dishwasher fluidly coupled to a reuse tank. The methods of the invention can advantageously be used when the user may need to save water or any other liquid resources provided to the dishwasher for the subsequent wash/rinse step. Further the invention may be used to prevent the buildup or proliferation of micro-organisms and corresponding odor originating from liquid inside the reuse tank, which may be unfavorable from customer's viewpoint. By controlling operating parameters of the components that are already installed with the dishwasher, the possibility of contamination of the reuse tank by micro-organisms can be minimized. Further the damage to the dishwasher from the abrupt change in the ambient temperature can be prevented.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims. For example, while the present invention is described in terms of a separate embodiment described in FIGS. 4, 6 and 7 respectively, it can also be implemented in embodiments as a whole. Specifically, where the dishwasher 10 is provided with the pH sensor 70, the thermistor 42 and the clock 84, liquid may be drained from the reuse tank 52 whenever one of the pH, ambient air temperature or the time passage first satisfies the threshold.

What is claimed is:

1. A dishwasher comprising:
   a cabinet defining an interior;
   a tub provided within the interior of the cabinet, the tub defining a treating chamber to receive and treat utensils according to a wash cycle;
   spray arm assemblies disposed within the treating chamber, the spray arm assemblies configured to supply liquid to the treating chamber during the wash cycle;
   a reuse tank disposed within the cabinet for storing liquid captured during the wash cycle for use later in the wash cycle or during a subsequent wash cycle after the wash cycle;
   a thermistor positioned and configured to generate output indicative of temperature inside or around the dishwasher;
   a sump formed with or affixed to a lower portion of the tub, the sump configured to collect, via force of gravity, the liquid supplied to the treating chamber;
   an outlet conduit that fluidly couples the reuse tank to the sump;
   a control valve disposed in relation to the outlet conduit to control flow of the liquid from the reuse tank to the sump; and
   a controller operably coupled to the thermistor and the control valve, the controller configured to manipulate the control valve to cause the liquid stored in the reuse tank to drain from the reuse tank to the sump when the controller determines, from the output of the thermistor, that the temperature inside or around the dishwasher is less than a predetermined threshold temperature.

2. The dishwasher of claim 1, wherein
   the thermistor is positioned to generate output indicative of the temperature of air in the tub.

3. The dishwasher of claim 1, wherein
   the thermistor is positioned to generate output indicative of the temperature of air around the dishwasher.

4. The dishwasher of claim 1, wherein
   the thermistor is positioned to generate output indicative of the temperature of air within the reuse tank.

5. The dishwasher of claim 1, wherein
   the predetermined threshold temperature is a temperature at which the liquid would freeze.

6. The dishwasher of claim 1, wherein
   the predetermined threshold temperature is a temperature that is high enough to prevent the liquid from freezing.

7. The dishwasher of claim 1 further comprising:
   a drain pump operably connected to the controller and fluidly coupled to the sump and a drain via a drain conduit, the drain pump configured to drain liquid from the sump to the drain;
   wherein, the controller is further configured to manipulate the drain pump to drain the liquid from the sump to the drain, when the controller determines, from the output of the thermistor, that the air temperature inside or around the dishwasher is less than a second predetermined threshold temperature that is colder than the predetermined threshold temperature.

8. The dishwasher of claim 1, wherein
   the thermistor is disposed in the sump.

9. The dishwasher of claim 1, wherein
   the thermistor is disposed within the reuse tank.

10. The dishwasher of claim 9, wherein
    the thermistor is positioned to contact the liquid in the reuse tank while generating the output upon which the controller relies.

11. The dishwasher of claim 9 further comprising:
    a heater operably coupled to the controller, the heater configured to heat the liquid disposed within the reuse tank;
    wherein, the controller is configured to cause the heater to heat the liquid within the reuse tank before causing the liquid stored in the reuse tank to drain from the reuse tank.

* * * * *